(12) United States Patent
Chang et al.

(10) Patent No.: US 11,263,180 B2
(45) Date of Patent: Mar. 1, 2022

(54) METHOD FOR FACILITATING RECOVERY FROM CRASH OF SOLID-STATE STORAGE DEVICE, METHOD OF DATA SYNCHRONIZATION, COMPUTER SYSTEM, AND SOLID-STATE STORAGE DEVICE

(71) Applicant: National Tsing Hua University, Hsinchu (TW)

(72) Inventors: Yun-Sheng Chang, Hsinchu (TW); Ren-Shuo Liu, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 16/797,944

(22) Filed: Feb. 21, 2020

(65) Prior Publication Data
US 2020/0272604 A1    Aug. 27, 2020

Related U.S. Application Data

(60) Provisional application No. 62/873,253, filed on Jul. 12, 2019, provisional application No. 62/809,580, filed on Feb. 23, 2019.

(51) Int. Cl.
*G06F 12/00* (2006.01)
*G06F 16/178* (2019.01)
(Continued)

(52) U.S. Cl.
CPC .......... *G06F 16/178* (2019.01); *G06F 3/0617* (2013.01); *G06F 3/0619* (2013.01);
(Continued)

(58) Field of Classification Search
CPC .... G06F 16/178; G06F 3/0617; G06F 3/0659; G06F 3/0679; G06F 12/0804; G06F 12/0875; G06F 12/1009; G06F 2212/452
See application file for complete search history.

(56) References Cited

U.S. PATENT DOCUMENTS

| 2008/0034154 A1* | 2/2008 | Lee ..................... G06F 12/0246 711/103 |
| 2009/0150599 A1* | 6/2009 | Bennett ............... G06F 11/1471 711/103 |

(Continued)

FOREIGN PATENT DOCUMENTS

| CN | 107870744 A | 4/2018 |
| TW | 201142621 A1 | 12/2011 |

OTHER PUBLICATIONS

Chang et al., "OPTR: Order-Preserving Translation and Recovery Design for SSDs with a Standard Block Device Interface", Aug. 2019, System and Storage Design Lab Department of Electrical Engineering National Tsing Hua University, pp. 1-29. (Year: 2019).*

(Continued)

*Primary Examiner* — John A Lane
(74) *Attorney, Agent, or Firm* — Birch, Stewart, Kolasch & Birch, LLP

(57) ABSTRACT

A method for facilitating recovery from a crash of a solid-state storage device (SSD) is adapted to be implemented by an SSD controller of the SSD that receives a write request. The method includes: assigning a write request identifier (WID) and a request size in a spare area of each written page of the SSD; counting a number of appearances of the WID in all written page(s) to result in a WID count; determining whether the WID count is equal to the request size; and determining that the write request is completed and is eligible for recovery after a crash of the SSD when it is determined that the WID count is equal to the request size.

10 Claims, 15 Drawing Sheets

(51) Int. Cl.
*G06F 3/06* (2006.01)
*G06F 12/1009* (2016.01)
*G06F 12/0875* (2016.01)
*G06F 12/0804* (2016.01)

(52) U.S. Cl.
CPC .......... *G06F 3/0659* (2013.01); *G06F 3/0679* (2013.01); *G06F 12/0804* (2013.01); *G06F 12/0875* (2013.01); *G06F 12/1009* (2013.01); *G06F 2212/1032* (2013.01); *G06F 2212/2022* (2013.01); *G06F 2212/452* (2013.01); *G06F 2212/7201* (2013.01)

(56) References Cited

U.S. PATENT DOCUMENTS

| | | | |
|---|---|---|---|
| 2012/0011340 A1* | 1/2012 | Flynn | G06F 12/0292 711/171 |
| 2012/0239860 A1* | 9/2012 | Atkisson | G06F 12/0246 711/103 |
| 2013/0166855 A1* | 6/2013 | Batwara | G06F 9/5016 711/154 |
| 2014/0068183 A1* | 3/2014 | Joshi | G06F 3/0662 711/114 |
| 2015/0186258 A1* | 7/2015 | Edelhaeuser | G06F 12/0238 711/103 |
| 2016/0085837 A1* | 3/2016 | Kotagiri | G06F 16/27 707/634 |
| 2016/0132251 A1* | 5/2016 | Hwang | G06F 3/0679 711/154 |
| 2017/0060698 A1* | 3/2017 | Noe | G06F 11/1471 |
| 2017/0139839 A1* | 5/2017 | Ke | G06F 3/0679 |
| 2019/0243578 A1* | 8/2019 | Thompson | G06F 3/068 |
| 2020/0081830 A1* | 3/2020 | Desai | G06F 12/0246 |
| 2020/0349072 A1* | 11/2020 | Fliess | G06F 12/0804 |
| 2021/0056016 A1* | 2/2021 | Bulusu | G06F 3/0622 |

OTHER PUBLICATIONS

Taiwanese Search Report for Taiwanese Application No. 109105697, dated Jan. 25, 2021, with English translation.

* cited by examiner

METHOD FOR FACILITATING RECOVERY FROM CRASH OF SOLID-STATE STORAGE DEVICE, METHOD OF DATA SYNCHRONIZATION, COMPUTER SYSTEM, AND SOLID-STATE STORAGE DEVICE

CROSS-REFERENCE TO RELATED APPLICATION

This application claims priorities of U.S. Provisional Patent Application No. 62/809,580, filed on Feb. 23, 2019, and U.S. Provisional Patent Application No. 62/873,253, filed on Jul. 12, 2019.

FIELD

The disclosure relates to a computer system, a method for facilitating recovery from a crash of a solid-state storage device (SSD), a method of data synchronization, and a SSD.

BACKGROUND

A conventional solid-state storage device (SSD), especially a consumer-grade SSD with a standard block device interface, is often short of sufficient mechanisms for crash recovery at disk level. Therefore, developers of filesystems and/or application software have to resort to additional measures to ensure stronger guarantee of data integrity (and sometimes data security) upon a crash, such as to modify the filesystems and/or application software to issue redundant write requests or flush requests. However, most of these measures may be unfavorable when considering overhead, and may be adverse to overall system performance.

SUMMARY

Therefore, an object of the disclosure is to provide a computer system, a method for facilitating recovery from a crash of a solid-state storage device (SSD), a method of data synchronization, and a SSD that can alleviate at least one of the drawbacks of the prior art.

According to one aspect of the disclosure, the SSD includes a nonvolatile memory and an SSD controller. The nonvolatile memory includes a plurality of pages each of which has a spare area. The SSD controller receives from a host a write request to write data in at least one of the pages. The method for facilitating recovery from a crash of an SSD includes steps of:

assigning, by the SSD controller according to an order in which the write request was received, a write request identifier (WID) in the spare area of each of at least one written page that is written with the data, where the WID is a unique sequence number for the write request;

assigning, by the SSD controller, a request size in the spare area of each of the at least one written page, where the request size indicates a total number of the at least one of the pages in which the write request is to write the data;

counting, by the SSD controller, appearance of the WID in the at least one written page to result in a WID count;

determining, by the SSD controller, whether the WID count is equal to the request size; and determining, by the SSD controller, that the write request is completed and is eligible for recovery after a crash of the SSD when it is determined that the WID count is equal to the request size.

According to another aspect of the disclosure, the method of data synchronization is to be implemented by a computer system that includes a computing apparatus and the SSD. The computing apparatus executes application software and data management software, and includes a main memory. The SSD is communicable with the computing apparatus. The method includes steps of:

issuing, by the application software to the data management software, an instruction of synchronization for synchronizing the main memory and the SSD; and by the data management software in response to receipt of the instruction of synchronization, issuing a command to transfer a journal to the SSD, and issuing a command to transfer a commit record to the SSD immediately subsequent to issuing the command to transfer the journal.

According to still another aspect of the disclosure, the computer system includes a solid-state storage device (SSD) that includes a nonvolatile memory, a main memory that is configured to store software, and a processor that is electrically connected to the SSD and the main memory, and that is configured to execute the software stored in the main memory. The SSD is configured to receive a plurality of write requests in order. Each of the write requests contains a specified address range and data to be written in the SSD. The SSD is operable in an order-preserving mode where the SSD persists, in the nonvolatile memory, the data contained in the write requests according to an order in which the write requests are received.

According to further another aspect of the disclosure, the SSD includes a nonvolatile memory and receives a plurality of write requests in order. Each of the write requests contains data to be written in the SSD. The SSD is operable in an order-preserving mode where the SSD persists, in the nonvolatile memory, the data contained in the write requests according to an order in which the write requests are received.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
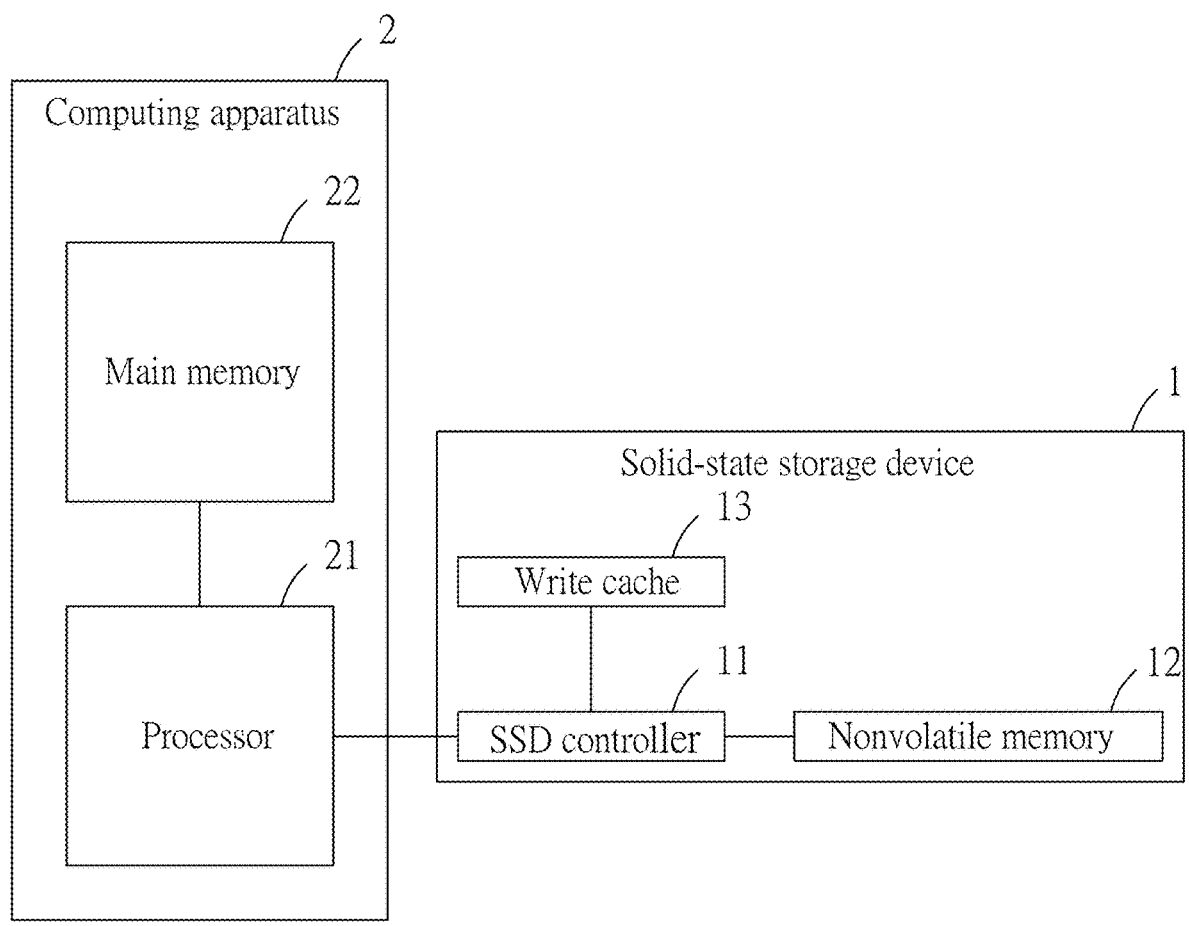
FIG. 1 is a block diagram illustrating an embodiment of a computer system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

In spite of the fact that solid-state storage devices (SSDs) have been widely used for decades, design principles for optimizing performance of a hard disk drive (HDD) remain pervasive in computer systems compatible with both SSDs and HDDs, such as minimization of seek time and rotational latency by means of reordering requests based on the pickup head position of the HDD. However, SSDs may not benefit from such design principles due to differences in physical structure and operating principle between the SSD and the HDD. For example, reordering requests may complicate the search space needed by filesystems or applications to recover from a crash of an SSD.

To enhance data integrity against crash events, one type of SSD (hereinafter referred to as a transactional SSD) is endowed with a set of properties related to database transactions which include atomicity, consistency, isolation and durability (ACID). Transactions are often composed of multiple statements, and atomicity guarantees that each transaction is treated as a single unit, which either succeeds completely, or fails completely. Durability guarantees that once a transaction has been committed, it will remain committed even in the case of a system failure (e.g., power outage or crash, and a crash is given as an example hereinafter to represent the system failure). Using a revolutionized interface, the transactional SSD offers stronger crash guarantee than an SSD with a conventional interface (hereinafter referred to as a baseline SSD). Nevertheless, recognizing the dramatic system changes required to become compatible with a transactional SSD, a lot of existing filesystems (e.g., fourth extended filesystem, Ext4, for Linux operating system) and application software (e.g., SQLite database management system) still utilize the conventional interface (e.g., a standard block device interface like SATA, which is optimized for HDDs) in establishing communication with SSDs instead of adopting the revolutionized interface used by transactional SSDs. Therefore, backward compatibility is still demanded when optimizing data integrity of an SSD to against a crash.

Referring to FIG. 1, an embodiment of a computer system according to the disclosure is illustrated. The computer system includes a computing apparatus 2 and an SSD 1.

The computing apparatus 2 may be implemented by a personal computer (PC), a database server, a cloud server, a laptop computer, a tablet computer, a mobile phone, a wearable computer, a smartwatch, a television, a datacenter cluster, a network attached storage or the like. However, implementation of the computing apparatus 2 is not limited to the disclosure herein and may vary in other embodiments. The computing apparatus 2 includes a main memory 22 that is configured to store software, and a processor 21 that is electrically connected to the SSD 1 and the main memory 22, and that is configured to execute the software stored in the main memory 22. The SSD 1 and the computing apparatus 2 are communicable with each other via a disk interface, especially, the widely-used standard block device interface, such as SATA.

The SSD 1 includes a write cache 13, a nonvolatile memory 12 and an SSD controller 11.

In this embodiment, the write cache 13 is implemented by a volatile memory such as a static random access memory (SRAM), a synchronous dynamic random access memory (SDRAM) or a dynamic random access memory (DRAM), but is not limited thereto.

The nonvolatile memory 12 is exemplified by flash memory, such as a flash chip, but is not limited thereto and may vary in other embodiments. For example, the nonvolatile memory 12 may be one of a battery-powered DRAM, 3D XPoint memory, phase-change memory (PCM), spin-transfer torque magnetic RAM (STT-MRAM), resistive RAM (ReRAM), an electrically erasable programmable read-only memory (EEPROM), and so on.

The flash chip includes a plurality of blocks. Each of the blocks includes a plurality of flash pages, and each of the flash pages has a user area and a spare area. The user area includes a plurality of sectors.

The SSD controller 11 executes firmware that includes a flash translation layer (FTL). The FTL is adapted to translate a set of requests (e.g., a write request, a read request and a flush request) issued by a host (e.g., an operating system run by the computing apparatus 2) into a set of flash operations (e.g., page-program, page-read, and block-erase). In this embodiment, the FTL is implemented by a page-level FTL, but is not limited thereto and may be a block-level FTL or a hybrid FTL in other embodiments.

Specifically speaking, after receiving from the host a write request to write data in a specified address range of the SSD 1, the SSD controller 11 executing the FLT is configured to segment the data into pages based on the specified address range, with each of the pages being indexed by a logical page number (LPN), and to write the data thus segmented in at least one of the flash pages, with each of the flash pages being indexed by a physical page number (PPN). A correspondence relationship between the LPNs and PPNs is recorded in a logical-to-physical (L2P) mapping table. Afterward, in response to receipt of a read request from the host to retrieve the data written in the specified address range, the SSD controller 11 executing the FLT is configured to translate the specified address range into the LPNs, and then to look up the PPNs corresponding to the LPNs in the L2P mapping table. In this way, the SSD controller 11 is able to return the data written in the specified address range (hereinafter also referred to as readout data) to the host.

It should be noted that the access speed of the flash chip, especially for the page-program (i.e., the flash operation to write data in the flash page), is much slower than that of the DRAM. Therefore, to enhance efficiency of operations of the SSD, a write request received from the host is usually cached in the write cache 13 before performing the page-program.

Upon receiving a flush request, the SSD controller 11 executing the FLT is configured to refrain from returning a successful acknowledgement to the host until all valid data or dirty data (i.e., data of incomplete write requests) in the write cache 13 has been stored in stable media such as the nonvolatile memory 12 (i.e., the flash chip in this embodiment).

Conventionally, high performance schemes such as internal parallelism, request scheduling, and write caching are adopted to improve performance of the SSDs. However, these high performance schemes all break the order of write requests. For the SSD 1 of the computer system according to the disclosure, when receiving a plurality of write requests in order, wherein each of the write requests contains a specified address range and data to be written in the SSD 1, the SSD 1 is operable in an order-preserving mode where the SSD 1 persists, in the nonvolatile memory, the data contained in the write requests according to an order in which the write requests are received. It should be noted that once data has been persisted in an SSD, the data will be reserved for recovery when a crash of the SSD occurs regardless of whether or not the data is written in a nonvolatile memory of the SSD. Hereinafter, the SSD 1 of the computer system according to the disclosure will also be referred to as an Order-Preserving Translation and Recovery (OPTR) SSD.

Furthermore, in a scenario where the SSD 1 sequentially receives a first write request that contains a first address range of the SSD 1 and first data to be written in the first address range, and a second write request that contains a second address range of the SSD 1 and second data to be written in the second address range, the SSD 1 is configured to, during recovery from a crash of the SSD 1, restore the second address range to the state of not having been updated by the second write request (i.e., to restore the second address range to a state before being programmed by the second write request) when it is determined that the first address range has been partially updated by the first write request and the second address range has been fully updated by the second write request.

It should be noted that on account of adopting high performance schemes of the SSD such as internal parallelism, the actual order of writing data onto the nonvolatile memory 12 (i.e., the order of executing page-program) is not really preserved in the OPTR SSD. In fact, it is the order in which write requests are received and according to which data are to be persisted in the nonvolatile memory 12 that is actually preserved after a crash of the OPTR SSD.

To facilitate recognition of the order preserving feature of an SSD by the computer system, in one embodiment, the SSD 1 further includes an identifier of order-preserving guarantee which indicates that the SSD 1 is operating in the order-preserving mode. The identifier may be software-accessible, and may be either editable or read-only. Additionally, in a scenario where the identifier is software-accessible and editable, the OPTR SSD may be configured, through editing the identifier, to switch between the order-preserving mode and a conventional mode adopted by the baseline SSD. Moreover, in a scenario where the identifier is software-accessible and read-only, the OPTR SSD may operate only in the order-preserving mode or may automatically determine an operation mode to switch to from the order-preserving mode.

In this embodiment, the identifier is a binary code. The processor 21 executing the software is configured to send a query about the identifier to the SSD 1, and to determine that the SSD 1 is operating in the order-preserving mode when it is determined based on a reply to the query that the logical value of the identifier thus queried is one. However, in other embodiments, the identifier may be in a predefined set (e.g., {1}), or may be a predefined set of one or more text strings that indicate a list of product names of the SSDs, or a predefined set of identification values of the SSDs.

In one embodiment, the computer system or the OPTR SSD is provided with a human-readable indicator indicating that the SSD 1 is operable in the order-preserving mode. The human-readable indicator is a symbol, a picture, a sticker or text on the SSD 1, or a relevant description posted on the Internet. However, implementation of the human-readable indicator is not limited to the disclosure herein and may vary in other embodiments.

It is worth to note that using a barrier is a type of order-preserving approach to guaranteeing that two requests received before and after a barrier request are completed in an order the two requests are received. In other words, the order of completing the two requests separated by the barrier cannot be altered, and a required partial order of transferring write requests to a disk may be assured, where the partial order means that the order of two requests respectively in a prior request group and a later request group separated by the barrier cannot be interchanged. However, taking into account backward compatibility, most of SSDs do not support a barrier request to realize order-preserving. Therefore, the flush request, which forces data in the write cache 13 that was received prior to the flush request to be written into the nonvolatile memory 12, is utilized as a substitute for the barrier request.

Referring to FIGS. 2 to 5, embodiments of a method of data synchronization according to the disclosure are illustrated. The method of data synchronization is adapted to be implemented by the computer system as previously described. In these embodiments, the software executed by the computing apparatus 2 is application software and a data management software, and the data management software can be a filesystem or an equivalent.

Figure 2:
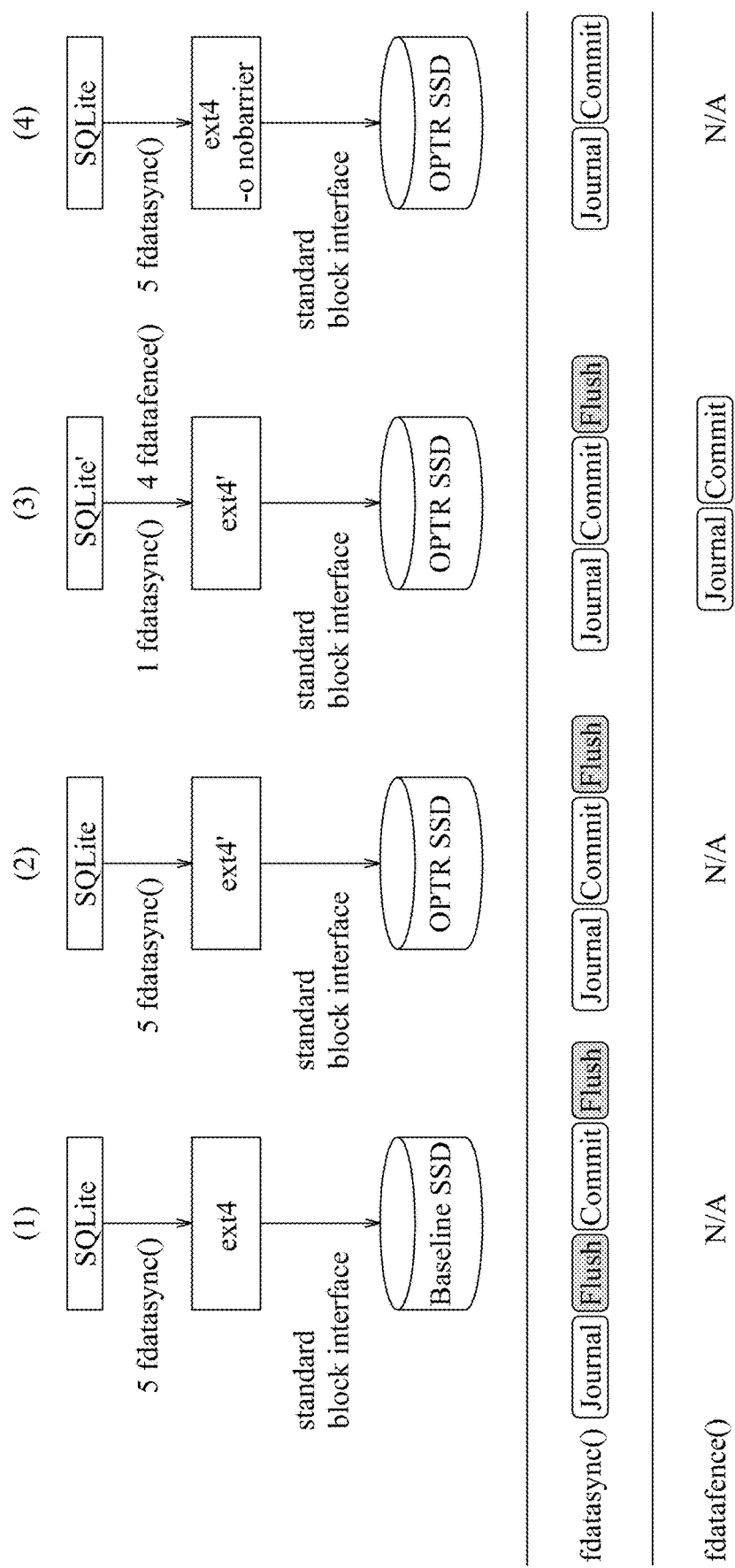
FIG. 2 is a schematic diagram illustrating embodiments of a method of data synchronization according to the disclosure.

Referring to part (1) of FIG. 2, the filesystem is exemplified by the ext4 for Linux operating system, and the application software is exemplified by the SQLite database management system. For a conventional baseline SSD, the application software issues an instruction of synchronization (i.e., "fdatasync( )" shown in FIG. 2) to the filesystem. In response to receipt of the instruction of synchronization, the filesystem issues a command to transfer a journal (i.e., "Journal" shown in FIG. 2, and the journal can be, e.g., a redo log or an undo log of the filesystem) to the SSD, issues a flush request (i.e., "Flush" shown in FIG. 2) immediately subsequent to issuing the command to transfer a journal, issues a command to transfer a commit record (i.e., "Commit" shown in FIG. 2) to the SSD immediately subsequent to issuing the flush request, and issues another flush request immediately subsequent to issuing the command to transfer a commit record. It is worth to note that the command to transfer a commit record serves as an action or a command to complete a transaction, i.e., to ensure that the transaction is atomic. The flush request between the journal and the commit record is used to prevent the conventional baseline SSD from persisting the commit record prior to the journal because the conventional baseline SSD does not guarantee that the write requests are completed in order and atomically. On the contrary, for the OPTR SSD of this disclosure, the flush request between the journal and the commit record is safely omissible since the OPTR SSD guarantees to complete the write requests in order and atomically.

Figure 3:
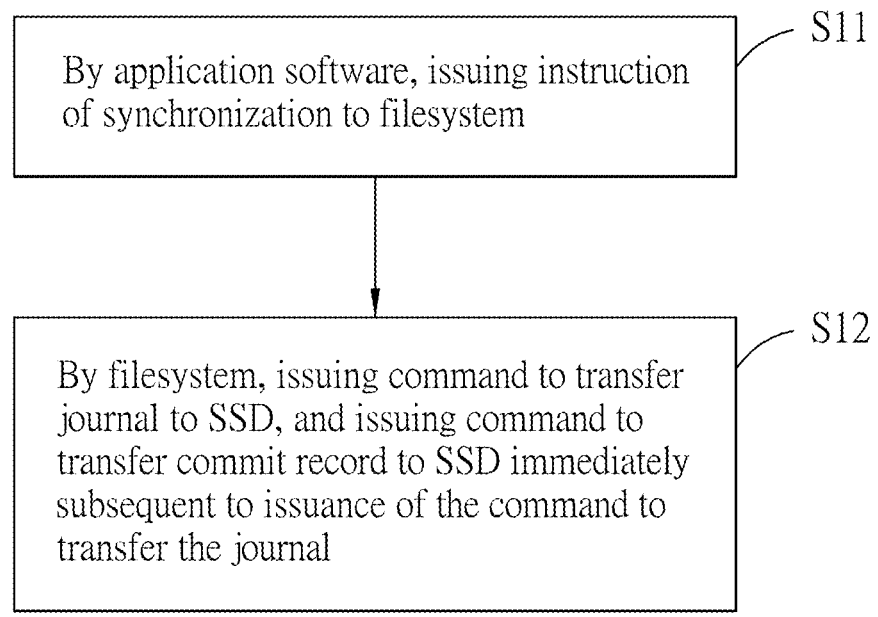
FIG. 3 is a flow chart illustrating one of embodiments of the method of data synchronization according to the disclosure.

In one of the embodiments of the method of data synchronization according to the disclosure, the processor 21 executing the software is configured to read the identifier of the SSD 1 so as to determine whether the SSD 1 is operating in the order-preserving mode, and to enable a no-barrier option of the software to refrain from issuing any flush request when it is determined that the SSD 1 is operating in the order-preserving mode. As a result, the flush requests immediately prior to and immediately subsequent to the command to transfer a commit record are both omitted when the instruction of synchronization is executed. Such embodiment is illustrated in FIG. 3 and part (4) of FIG. 2. In this embodiment, the filesystem is ext4 with the no-barrier option (denoted by "ext4-o nobarrier" in FIG. 2 and "ext4-nobarrier" in FIG. 6), and the application software is the SQLite. It should be noted that implementations of the filesystem and the application software are not limited to the disclosure herein and may vary in other embodiments.

In this embodiment, the method of data synchronization according to the disclosure includes steps S11 and S12 outlined below.

In step S11, the application software issues to the filesystem an instruction of synchronization for synchronizing the main memory 22 and the SSD 1.

In step S12, in response to receipt of the instruction of synchronization, the filesystem issues a command to transfer a journal to the SSD 1, and issues a command to transfer a commit record to the SSD 1 immediately subsequent to issuing the command to transfer the journal. In other words, the command to transfer the journal is issued without being succeeded by a flush request.

This embodiment is practical and useful for applications like smartphones, consumer-grade computers, and less-critical database systems such as SQlite.

Figure 4:
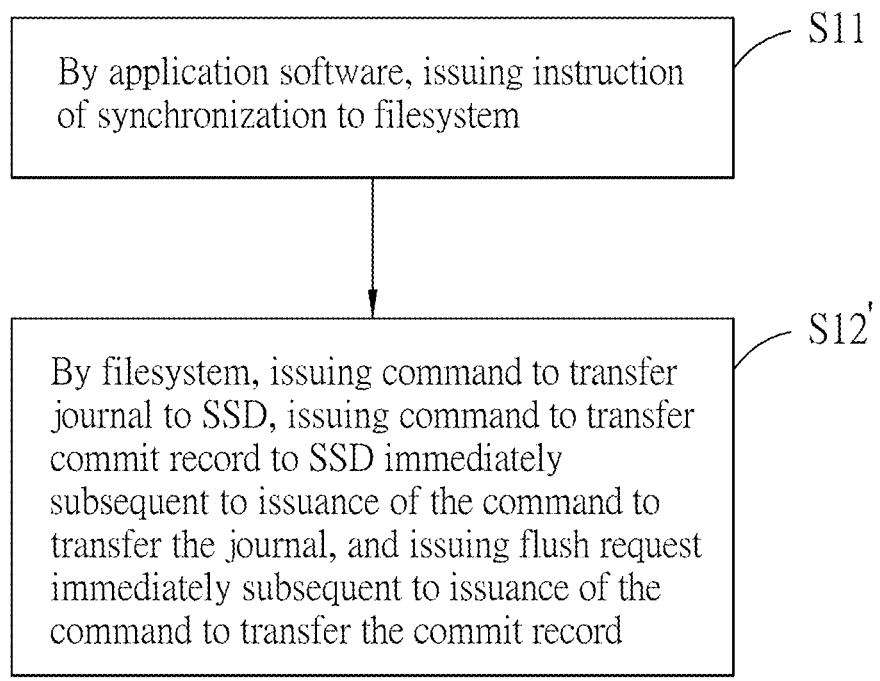
FIG. 4 is a flow chart illustrating another one of embodiments of the method of data synchronization according to the disclosure.

Referring to FIG. 4 and part (2) of FIG. 2, another one of the embodiments of the method of data synchronization according to the disclosure is illustrated. As shown in step S12', in this embodiment, in response to receipt of the instruction for synchronization issued in step S11 by the application software, SQLite, the filesystem further issues a flush request immediately subsequent to issuing the command to transfer the commit record. With minor modification on the filesystem (i.e., the filesystem denoted by "ext4'" as shown in FIG. 2), this embodiment may still guarantee the same durability as the conventional approach does in part (1) of FIG. 2.

Figure 5:
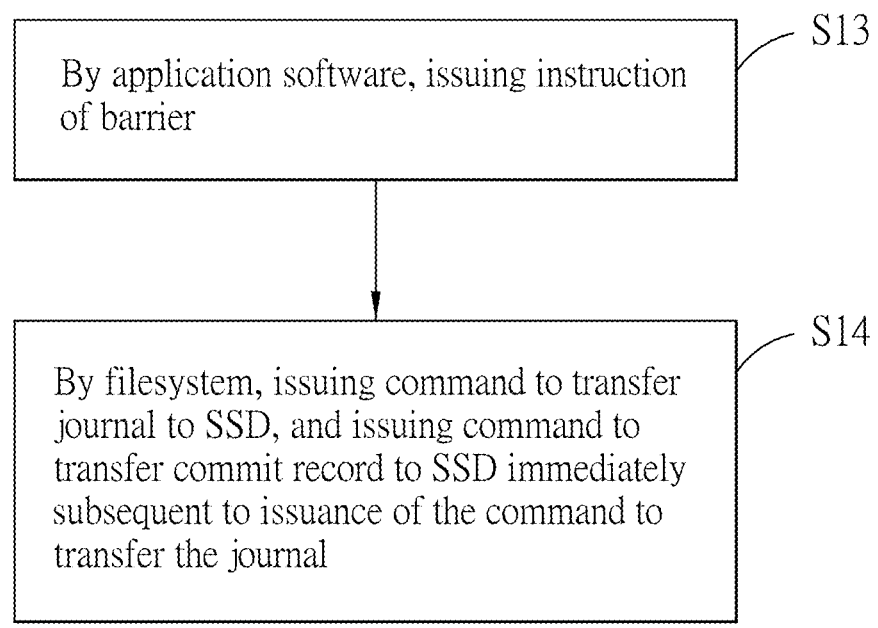
FIG. 5 is a flow chart illustrating still another one of embodiments of the method of data synchronization according to the disclosure.

Referring to FIG. 5 and part (3) of FIG. 2, still another one of the embodiments of the method of data synchronization according to the disclosure is illustrated. This embodiment is a variant of that shown in FIG. 4 and part (2) of FIG. 2, and the method of data synchronization further includes steps S13 and S14.

In step S13, the application software (i.e., "SQLite'" shown in FIG. 2) issues to the filesystem an instruction of barrier-only synchronization (i.e., "fdatafence( )" in FIG. 2 or other naming such as "fdatabarrier" in other embodiments) for synchronizing the main memory 22 and the SSD 1. In other words, the data management software offers two types of synchronization instructions that involve different numbers of flush commands for the application software to invoke, as shown in FIG. 2.

In step S14, in response to receipt of the instruction of barrier-only synchronization, the filesystem issues a command to transfer a journal to the SSD 1, and issues a command to transfer a commit record to the SSD 1 immediately subsequent to issuing the command to transfer the journal.

This embodiment additionally provides the instruction of barrier-only synchronization for applications where the barrier is required to define the required partial order of transferring write requests to the SSD, enhancing flexibility of applying the method of data synchronization according to the disclosure. Moreover, the instruction of synchronization can be used sparingly to promote performance of the overall computer system.

Figure 6:
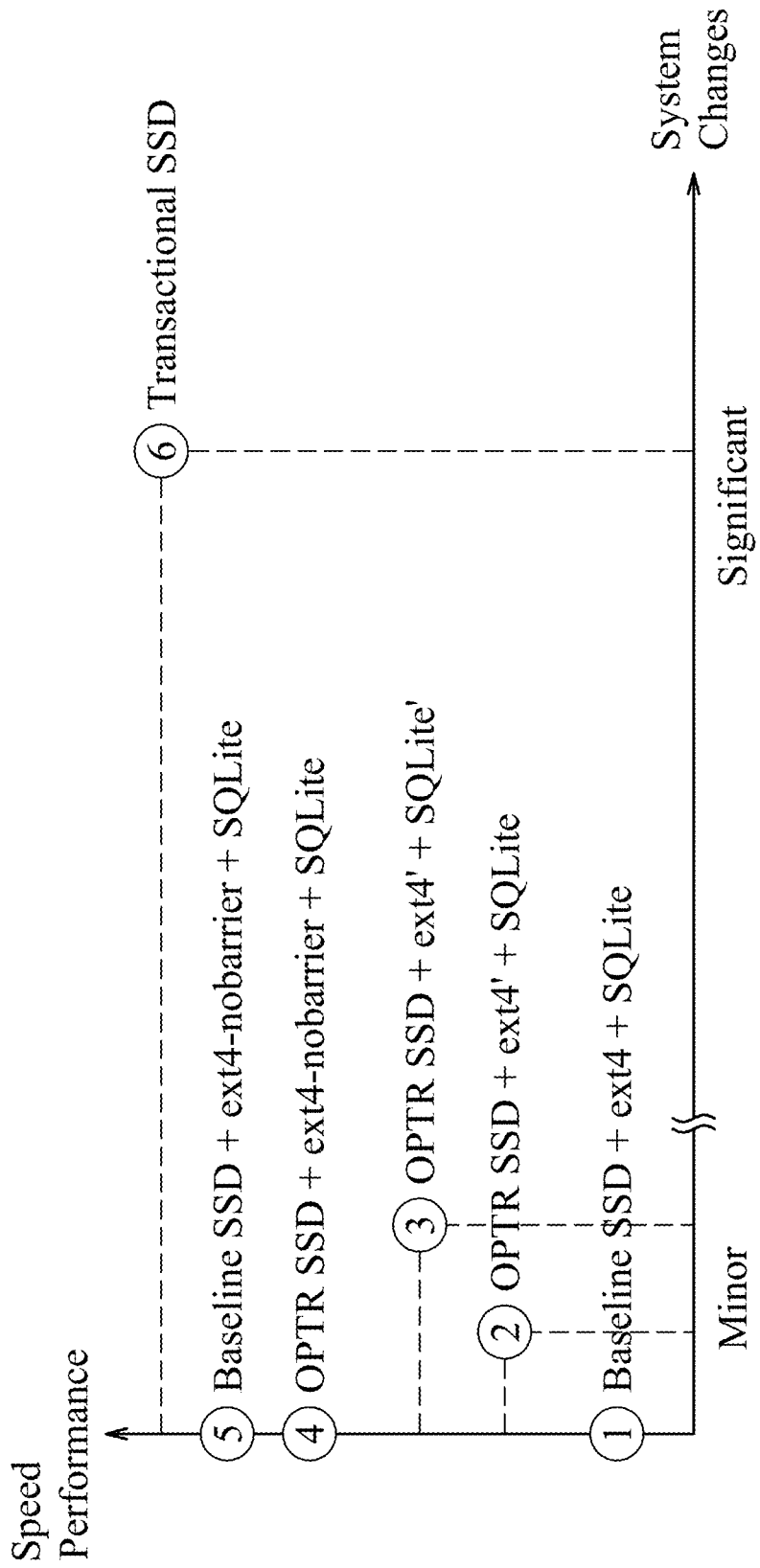
FIG. 6 is a schematic diagram illustrating performance of the method of data synchronization according to the disclosure.

Referring to FIG. 6, performance of the method of data synchronization according to the disclosure is illustrated. In the plot shown in FIG. 6, the vertical axis indicates speed performance, and the horizontal axis indicates extent of system changes. Evidently, compared with the conventional approach which is implemented with the baseline SSD (indicated by circle "1"), the method of data synchronization according to the disclosure (indicated by circles "2", "3" and "4") achieves significantly better speed performance at the cost of minor system changes. Moreover, compared with the conventional approach which is implemented with the baseline SSD (indicated by circles "1" and "5"), by utilizing the OPTR SSD, the method of data synchronization according to the disclosure (indicated by circles "2", "3" and "4") realizes stronger data integrity by providing stronger request-level crash guarantee.

Referring to FIGS. 7 to 11, an embodiment of a method for facilitating recovery from a crash of the aforementioned SSD 1 according to the disclosure is illustrated. The method according to the disclosure includes several mechanisms, e.g., write completion tracking, write coalescing tracking, mapping table checkpointing, garbage collection and order-preserving recovery, that will be described in the following paragraphs.

The request-level crash guarantee provided by the OPTR SSD according to the disclosure features request atomicity, prefix semantics and flush semantics.

Request atomicity guarantees that each write request received by the SSD 1 is atomic regardless of the request size (i.e., the number of sectors to be written). To ensure request atomicity, the method provides different strategies to determine completion of a write request respectively for cases where no page-coalescing occurs and for cases where page-coalescing occurs.

Figure 7:
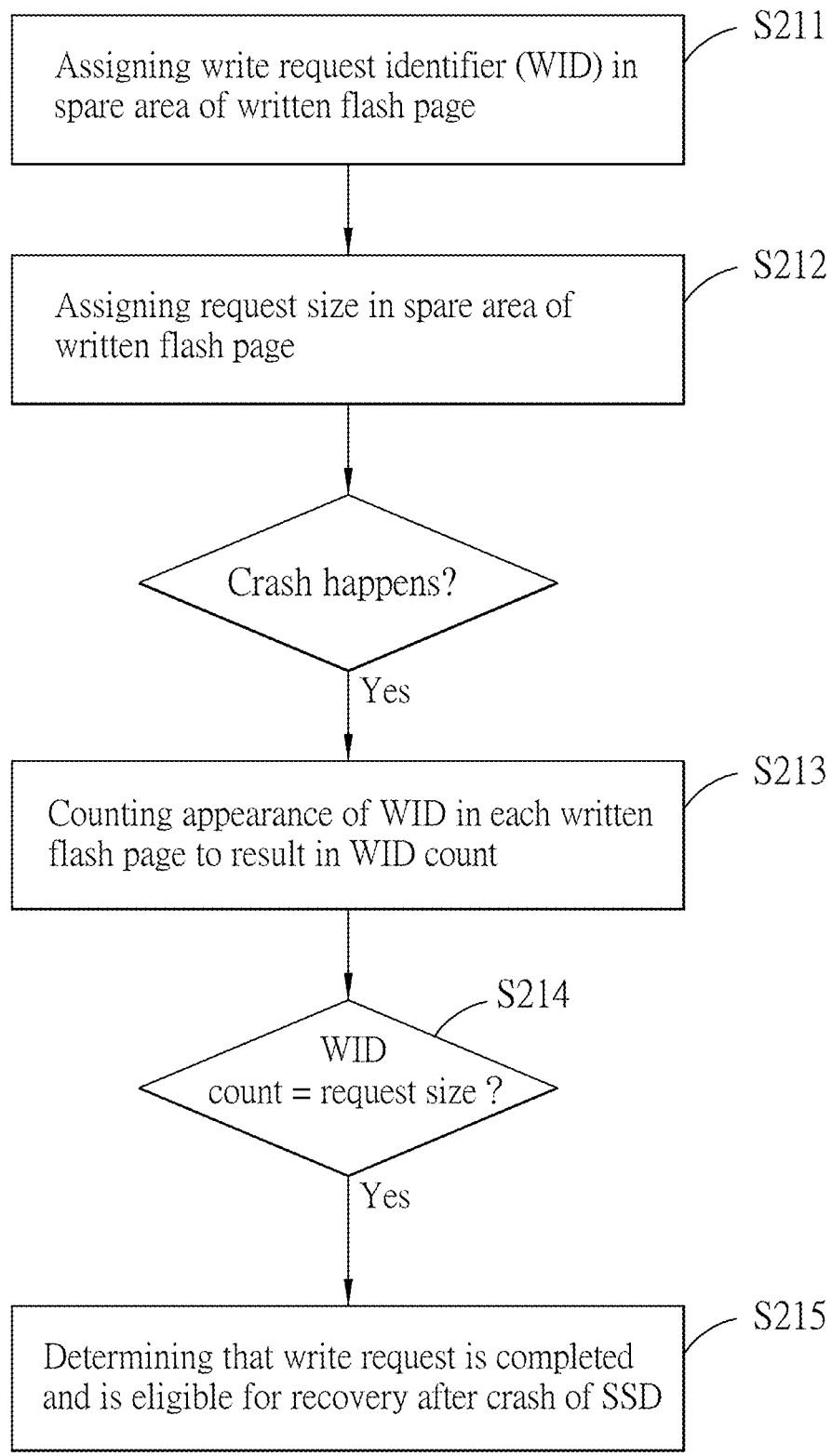
FIGS. 7, 8, 10, 12 and 13 are flow charts illustrating an embodiment of a method for facilitating recovery from a crash of a solid-state storage device (SSD) according to the disclosure.

Regarding the write completion tracking, for cases where no page-coalescing occurs, based on the fact that a write request which involves N pages is completed if and only if those N pages do exit in the flash chip after a crash, the method includes steps S211 to S215 as shown in FIG. 7 and outlined below.

In step S211, the SSD controller 11 assigns, according to an order in which the write request was received, a write request identifier (WID) in the spare area of each written flash page that is written with the data (there would be at least one written flash page). The WID is a unique sequence number for the write request, and is incremental with respect to the order of receiving the write request. In this embodiment, the WID is a 8-byte integer.

In step S212, the SSD controller 11 assigns a request size in the spare area of each of the at least one written flash page. The request size indicates a total number of the at least one of the flash pages in which the write request is to write the data. In this embodiment, the request size is expressed by a 4-byte integer. It should be noted that the order of executing steps S211 and S212 can be interchanged.

In step S213, the SSD controller 11 counts a number of appearances of the WID in the at least one written flash page to result in a WID count. It should be noted that step S213 is executed after occurrence of a crash.

In step S214, the SSD controller 11 determines whether the WID count is equal to the request size.

When it is determined that the WID count is equal to the request size, in step S215, the SSD controller 11 determines that the write request is completed and is eligible for recovery after a crash of the SSD 1.

Figure 8:
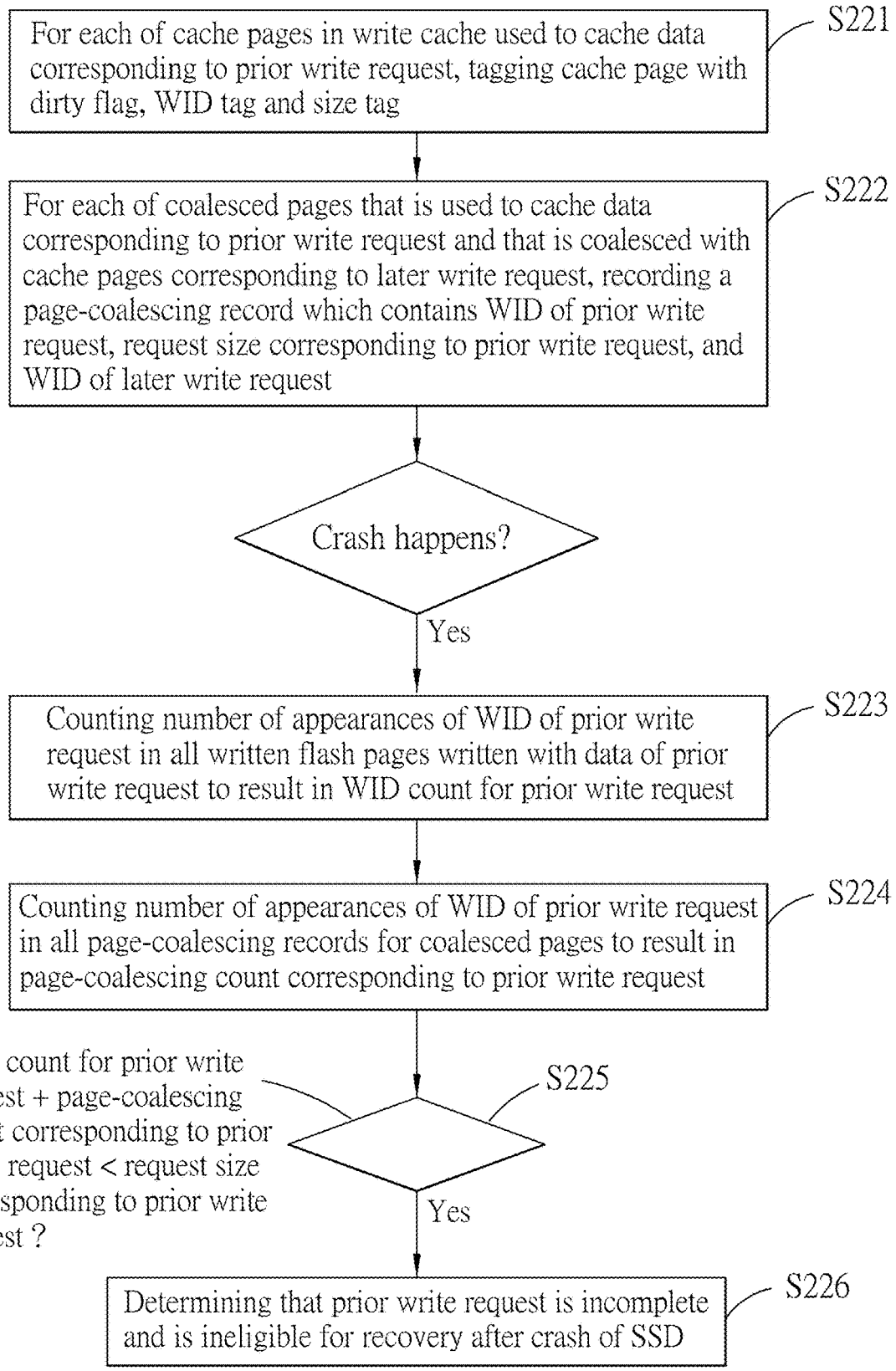

Regarding the write coalescing, two or more write requests may coalesce in the write cache of an SSD, and the write requests thus involved are referred to as coalesced write requests. This situation reduces a count of appearance(s) of the WID in the written flash page(s). When the SSD controller 11 receives a prior write request and a later write request both of which are to be coalesced in the write cache 13, the method according to the disclosure includes step S221 to S226 for determining whether the prior request is incomplete, as shown in FIG. 8 and outlined below.

In step S221, for each of cache pages in the write cache 13 used to cache data corresponding to the prior write request, the SSD controller 11 tags the cache page with a dirty flag, a WID tag and a size tag. The dirty flag indicates whether the cache page is a coalesced page which is coalesced with a cache page used to cache data corresponding to the later write request. The WID tag stores a WID of the prior write request. The size tag stores a request size which indicates a total number of flash pages in which the prior write request is to write the data.

In step S222, for each of the coalesced pages that is used to cache data corresponding to the prior write request and that is coalesced with the cache pages corresponding to the later write request, the SSD controller 11 records a page-coalescing record which contains the WID of the prior write request, the request size corresponding to the prior write request, and a WID of the later write request. In this embodiment, the page-coalescing record is initially recorded in a DRAM buffer of the SSD 1, and will be eventually transferred to a reserved block of the flash chip when an amount of accumulation of the page-coalescing records reaches a capacity of a flash page of the flash chip.

Figure 9:
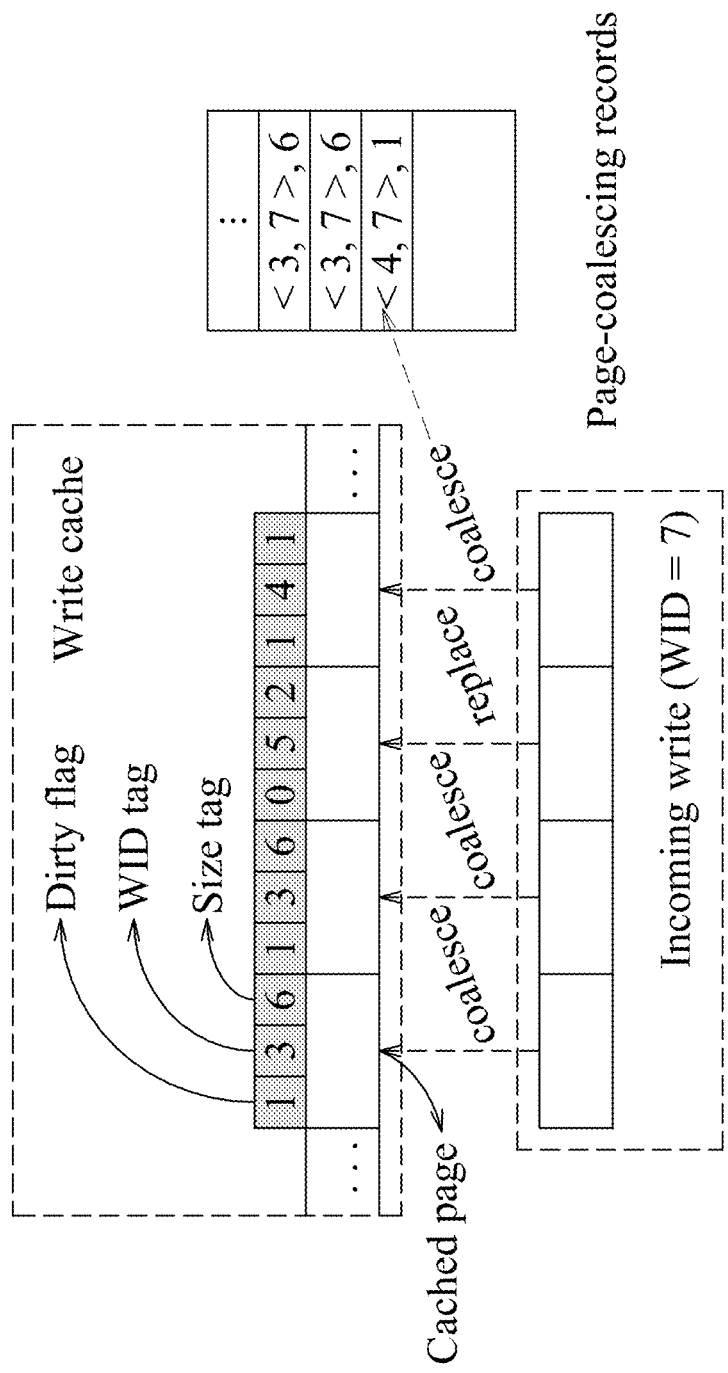
FIG. 9 is a schematic diagram illustrating an example of write coalescing tracking of the method for facilitating recovery from a crash of an SSD according to the disclosure.

Referring to an example of coalescing records shown in FIG. 9 for explanation, "<3, 7>, 6" denotes that a prior write request whose WID is 3 coalesces with a later write request whose WID is 7, and the request size of the prior write request is 6 pages.

In step S223, the SSD controller 11 counts a number of appearances of the WID of the prior write request in all written flash page(s) written with data of the prior write request (there would be at least one written flash page) to result in a WID count for the prior write request. It should be noted that step S223 is executed after occurrence of a crash.

In step S224, the SSD controller 11 counts a number of appearances of the WID of the prior write request in the page-coalescing records for the coalesced pages to result in a page-coalescing count corresponding to the prior write request. It should be noted that the order of executing steps S223 and S224 can be interchanged.

In step S225, the SSD controller 11 determines whether a sum of the WID count for the prior write request and the page-coalescing count corresponding to the prior write request is smaller than the request size corresponding to the prior write request.

When it is determined that the sum of the WID count for the prior write request and the page-coalescing count corresponding to the prior write request is smaller than the page size requested by the prior write request, in step S226, the SSD controller 11 determines that the prior write request is incomplete and is ineligible for recovery after a crash of the SSD 1. In mathematical expression, a coalesced write request with WID=i is incomplete if $P_i+D_i<Size_i$, where $P_i$ represents the number of written flash pages being assigned with WID=i, $D_i$ represents the number of recorded <x, y> pairs in the page-coalescing records with x=i, and $Size_i$ represents the request size corresponding to the coalesced write request with WID=i.

To satisfy prefix semantics so as to ensure that the order of write requests may be preserved, the SSD 1 does not make a write request durable unless all the write requests received previously by the SSD 1 are durable. Therefore, the method further includes a step in which the SSD controller 11 refrains from making the later write request durable until it is determined that the prior write request is durable. In one embodiment, in response to receipt of a query, the SSD controller 11 transmits an indicator indicating that the SSD controller 11 refrains from making the later write request durable until it is determined that the prior write request is durable.

Flush semantics guarantee durability to all write requests that are received prior to a flush request. Therefore, the method further includes a step in which, when the SSD controller 11 receives a flush request from the host after receiving the write request, the SSD controller 11 refrains from acknowledging the flush request until it is determined that the write request is completed.

Figure 10:
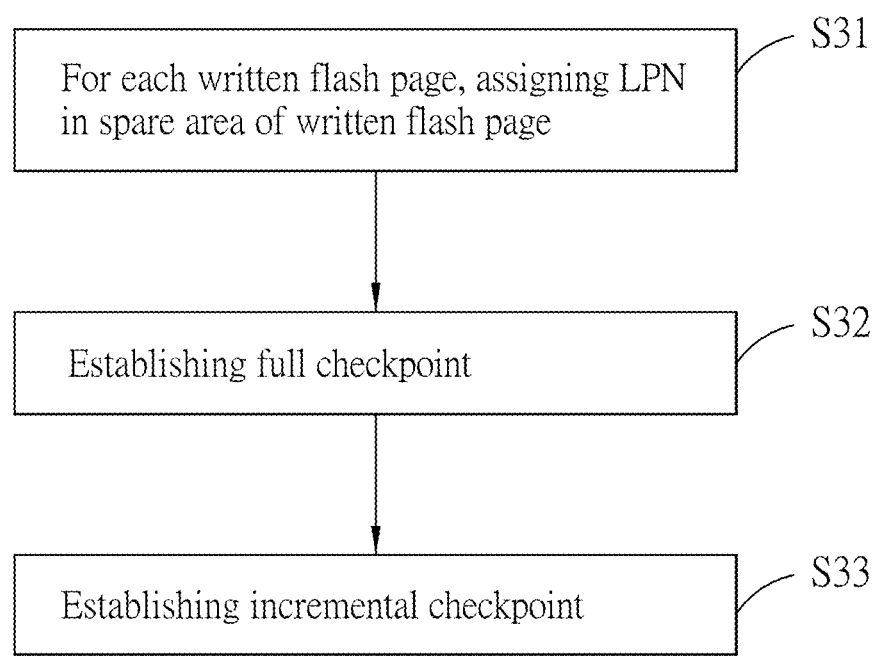
Figure 11:
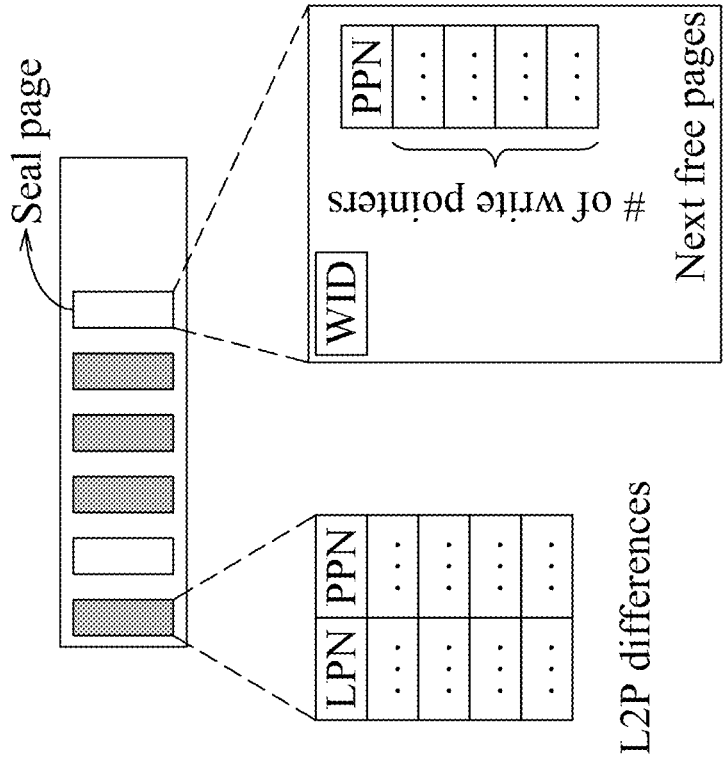
FIG. 11 is a schematic diagram illustrating an example of mapping table checkpointing of the method for facilitating recovery from a crash of an SSD according to the disclosure.
Figure 11:
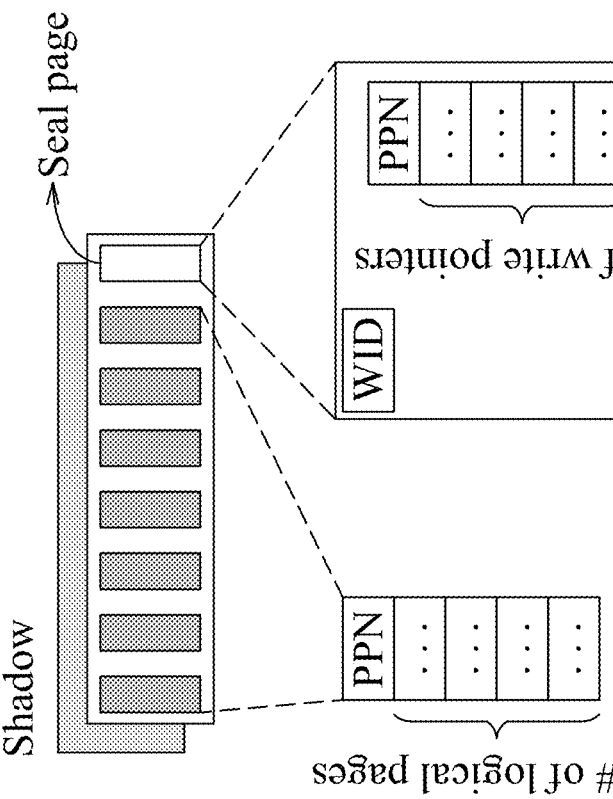

Regarding the mapping table checkpointing, the L2P mapping table is checkpointed to the flash chip to speed up recovery from a crash. The method according to the disclosure keeps a full checkpoint which snapshots the entirety of the L2P mapping table, and at least one incremental checkpoint which records only the differences in the L2P table that occur since the latest checkpoint (either the full checkpoint or an incremental checkpoint). Referring to FIGS. 10 and 11, the method includes steps S31 to S32 outlined below.

In step S31, the SSD controller 11 assigns, for each written flash page that is written with the data (there would be at least one written flash page), an LPN in the spare area of the written flash page in addition to the WID and the request size assigned in the spare area.

In step S32, the SSD controller 11 establishes a full checkpoint through storing an entirety of the L2P mapping table in a reserved block of the blocks of the flash chip. The full checkpoint contains a correspondence relationship between the LPN and the PPN for each of the at least one written flash page.

In step S33, the SSD controller 11 establishes an incremental checkpoint through storing a revised portion of the L2P mapping table revised after a latest checkpoint, which is one of the full checkpoint and the incremental checkpoint(s) that was established the last, was established. As shown in FIG. 11, each of the full checkpoint and the incremental checkpoint(s) contains a seal page that records (i) a WID corresponding to a latest write request at the time the corresponding one of the full checkpoint and the incremental checkpoint(s) was established, and (ii) a PPN corresponding to a next free flash page of the flash pages to serve as a page pointer at the time the corresponding one of the full checkpoint and the incremental checkpoint(s) was established. For an SSD 1 including multiple flash chips each of which may include a block being written, the page pointer recorded in the seal page may be plural in number when multiple blocks are written at the same time.

It is worth to note that the method according to the disclosure employs incremental checkpoints by default. When the space for storing incremental checkpoints is full, the method according to the disclosure creates a new full checkpoint and then clears the incremental checkpoints. Moreover, the method according to the disclosure employs a shadow for the full checkpoint to ensure integrity of mapping table checkpointing, and the WID can be used to determine the recency between the full and incremental checkpoints after a crash. When the shadow is employed, an immediately previous one of the full checkpoints is kept until written data that corresponds to a current one of the full checkpoints is ensured to be free from damage.

Figure 12:
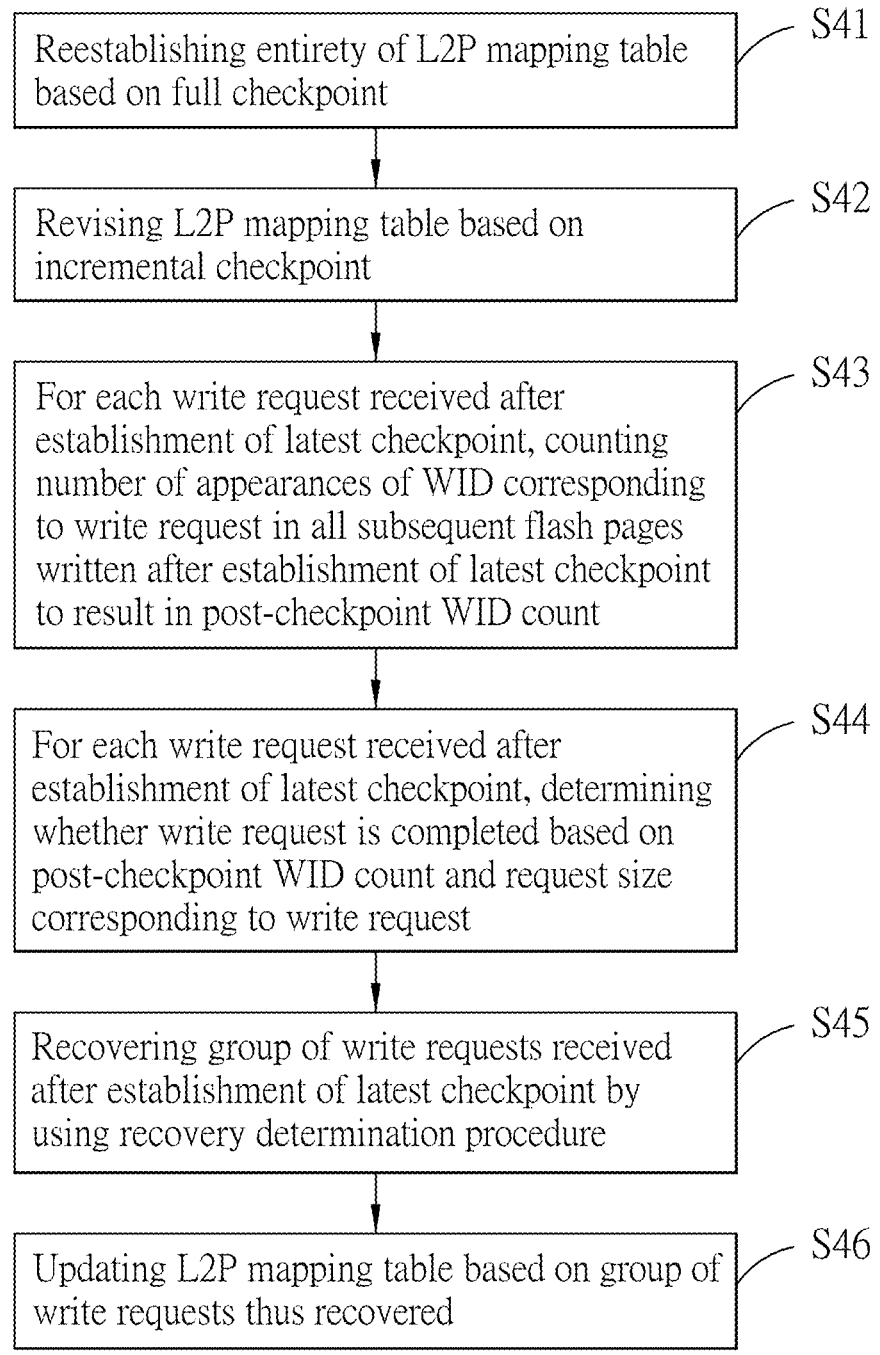

Regarding the order-preserving recovery, the crash recovery of the SSD 1 according to the disclosure is related to rebuilding the L2P mapping table, and the method according to the disclosure includes step S41 to S46 outlined below with reference to FIG. 12.

In step S41, the SSD controller 11 reestablishes the entirety of the L2P mapping table by retrieving the full checkpoint stored in the reserved block.

In step S42, the SSD controller 11 revises the L2P mapping table thus established by incorporating the revised portion(s) of the L2P mapping table contained in the incremental checkpoint(s) into the L2P mapping table thus reestablished.

In step S43, the SSD controller 11 counts, for each of write requests received after establishment of the latest checkpoint, a number of appearances of a WID corresponding to the write request in subsequent flash pages written with the data of the write request based on the PPN recorded in the seal page of the latest checkpoint, so as to result in a post-crash WID count to indicate a total number of appearances of the WID in the subsequent flash pages.

In step S44, the SSD controller 11 determines, for each of the write requests received after establishment of the latest checkpoint, whether the write request is completed based on the post-crash WID count and the request size corresponding to the write request.

In step S45, the SSD controller 11 recovers a group of the write requests received after establishment of the latest checkpoint by using a recovery determination procedure which is related to completeness of the write requests.

In step S46, the SSD controller 11 updates the L2P mapping table thus revised by incorporating changes of correspondence relationships between the LPNs and the PPNs of written flash pages related to the group of the write requests thus recovered.

Figure 13:
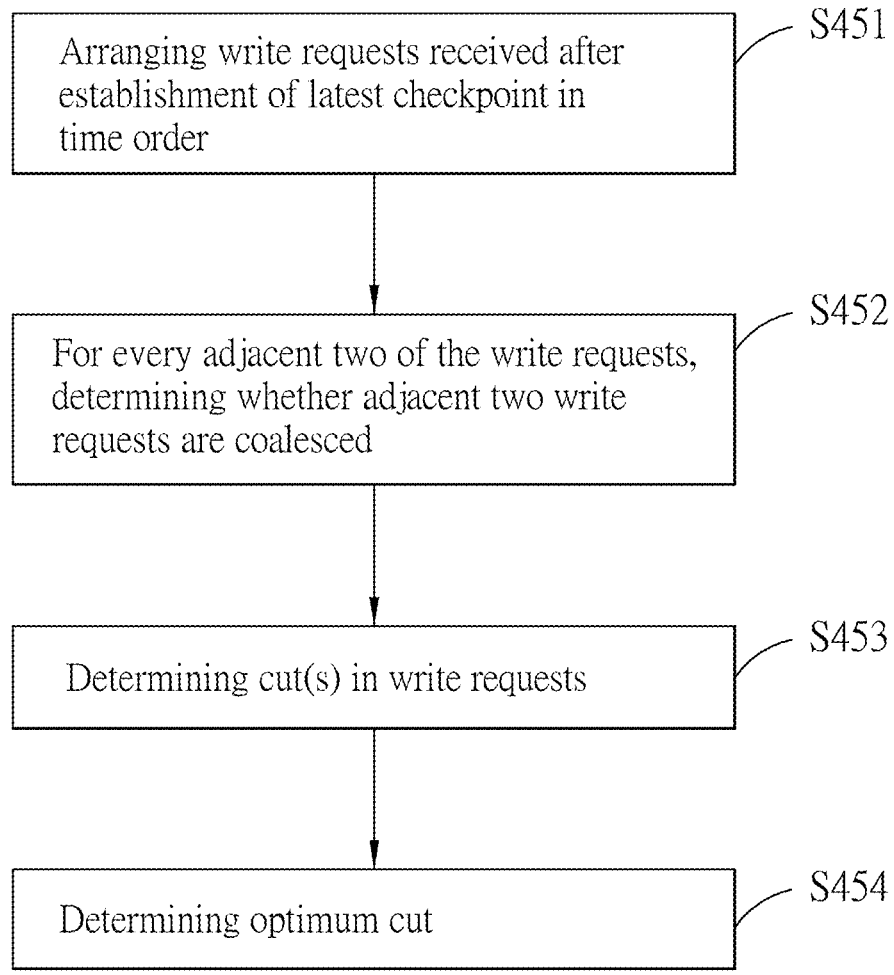

Specifically speaking, referring to FIG. 13, the recovery determination procedure used in step S45 includes sub-steps S451 to S454 outlined below.

In sub-step S451, the SSD controller 11 arranges the write requests received after establishment of the latest checkpoint in an order the write requests were received.

In sub-step S452, the SSD controller 11 determines, for every consecutive two of the write requests, whether the consecutive two of the write requests are coalesced.

In sub-step S453, the SSD controller 11 determines at least one cut, with each cut being between the write requests of a consecutive pair, where there is no coalescing for either of the write requests in the consecutive pair, and the write requests before the cut are all completed. In one embodiment, the write requests before the at least one cut serve as the group of the write requests to be recovered.

In sub-step S454, the SSD controller 11 determines an optimum cut from among the at least one cut, where a number of the write requests before the optimum cut is the greatest among the at least one cut, and the write requests before the optimum cut serve as the group of the write requests to be recovered.

Figure 14:
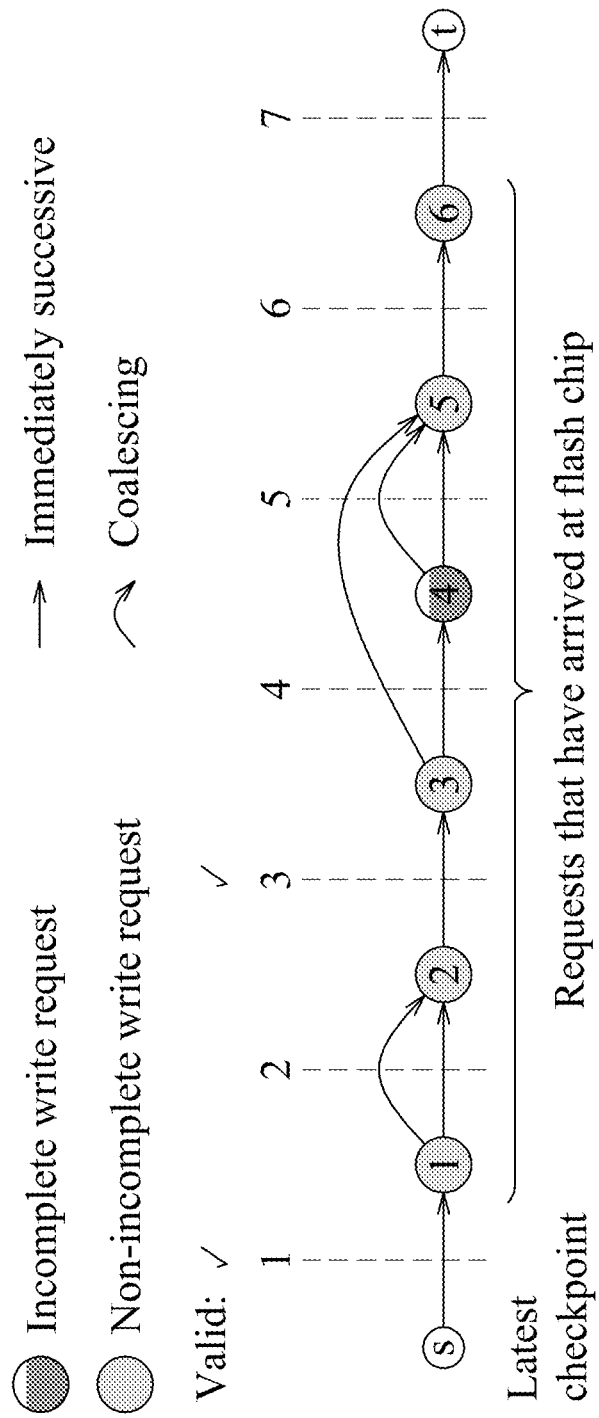
FIG. 14 is a schematic diagram illustrating an example of a recovery determination procedure of the method for facilitating recovery from a crash of an SSD according to the disclosure.

Referring to an example shown in FIG. 14 for explanation, there are six write requests after the latest checkpoint, and some of the data of the write requests has arrived in the flash chip. Potential cuts may occur at seven places "1" to "7", but only places "1" and "3" are fit to be cuts because the two write requests between each of places "1" and "3" are non-coalesced, and because the write requests before each of places "1" and "3" are all completed. Further, cut "3" will be determined as the optimum cut because the number of the write requests before cut "3" is the greater between the cuts "1" and "3".

Referring to Table 1, an example of pseudocode of the recovery determination procedure is illustrated.

TABLE 1

Find optimal recovery point

Input: $wid_{inc}$, C
Output: the optimal recovery point
1:   $wid_{rec} \leftarrow wid_{inc}$;
2:   Sort C by x in descending order;
3:   for c ∈ C do
4:     if c.x < $wid_{rec}$ ∧ c.y > $wid_{rec}$ then
5:       $wid_{rec} \leftarrow$ c.x;
6:     end if
7:   end for
8:   return $wid_{rec}$;

It should be noted that to meet requirements of the prefix semantics during recovery from a crash, in a scenario where the SSD controller 11 receives a prior write request and a later write request, the SSD controller 11 refrains from keeping the later write request until it is determined that the prior write request is completed.

Regarding the garbage collection, as in-place updates are forbidden in the flash chip of SSDs, overwriting data is done by writing the updated data to a free flash page and leaving the outdated data in the original flash page, which is called invalid flash page. The invalid flash page will be reclaimed by a dedicated routine, called garbage collection (GC), for further reuse. However, some of the invalid flash pages reclaimed by GC may be important to crash recovery, that is, this method may leverage these invalid flash pages to recover the OPTR SSD from a crash to an order-preserved state. Therefore, two constraints are enforced on GC, and the method according to the disclosure further includes the following two steps to respectively implement the two constraints.

In one step, while performing garbage collection, the SSD controller 11 refrains from reclaiming one of the flash pages that is written after establishment of the latest checkpoint. It should be noted that all write requests before a flush request should be durable and atomic, so this constraint prevents a violation of the flush semantics where flash pages written prior to a flush request but after the latest checkpoint are reclaimed by the GC, obstructing determination of completion of the write requests after the latest checkpoint.

In another step, the SSD controller 11 performs internal flush on the write cache 13 before performing garbage collection. Performing the internal flush would ensure that each of the flash pages reclaimed by the GC has a stable counterpart that can always survive after a crash. Therefore, tasks of GC can be simplified. To reduce the performance penalty of an internal flush, cost of performing the internal flush is mitigated by conducting GC on a batch of blocks (16 blocks in this embodiment).

In summary, the method for facilitating recovery from a crash of an SSD according to the disclosure realizes some of the transactional properties (i.e., atomicity and durability) on the SSD with the standard block device interface by modifying firmware (FTL) of the SSD to result in the OPTR SSD according to the disclosure. The OPTR SSD is endowed with strong request-level crash guarantees: a write request is not made durable unless all its prior write requests are durable; each write request is atomic; and all write requests prior to a flush request are guaranteed durable. Consequently, SSD performance may be maintained while achieving an equivalent effect that write requests are completed in order and atomically. As a result, the number of valid post-crash results can be effectively confined and significantly reduced, facilitating tasks of recovery from a crash by applications or filesystems.

For the purposes of explanation, a scenario is given as an example where the SSD controller 11 receives a first write request to update a first address range of the nonvolatile memory 12 of the SSD 1 by writing data of the first write request in the first address range, and a second write request to update a second address range of the nonvolatile memory 12 of the SSD 1 by writing data of the second write request in the second address range, wherein the second write request is issued by the host later than the first write request. Additionally, there is no flush request in between the first write request and the second write request, and no barrier request in between the first write request and the second write request. Referring to Table 2 below, in response to a read request to read data in the first address range and the second address range, the SSD controller 11 returns readout data which is guaranteed to belong to one of cases No. 1, 2, 3, 6 and 9 when partial update is allowed (see sub-column A in the last column of Table 2), or belong to one of cases No. 1, 3 and 9 when partial update is not allowed (see sub-column B in the last column of Table 2).

TABLE 2

| Case No. | 1st address range | 2nd address range | Readout data A | B |
|---|---|---|---|---|
| 1 | Fully updated | Fully updated | V | V |
| 2 | Fully updated | Partially updated | V | |
| 3 | Fully updated | Not updated at all | V | V |
| 4 | Partially updated | Fully updated | | |
| 5 | Partially updated | Partially updated | | |
| 6 | Partially updated | Not updated at all | V | |
| 7 | Not updated at all | Fully updated | | |
| 8 | Not updated at all | Partially updated | | |
| 9 | Not updated at all | Not updated at all | V | V |

Figure 15:
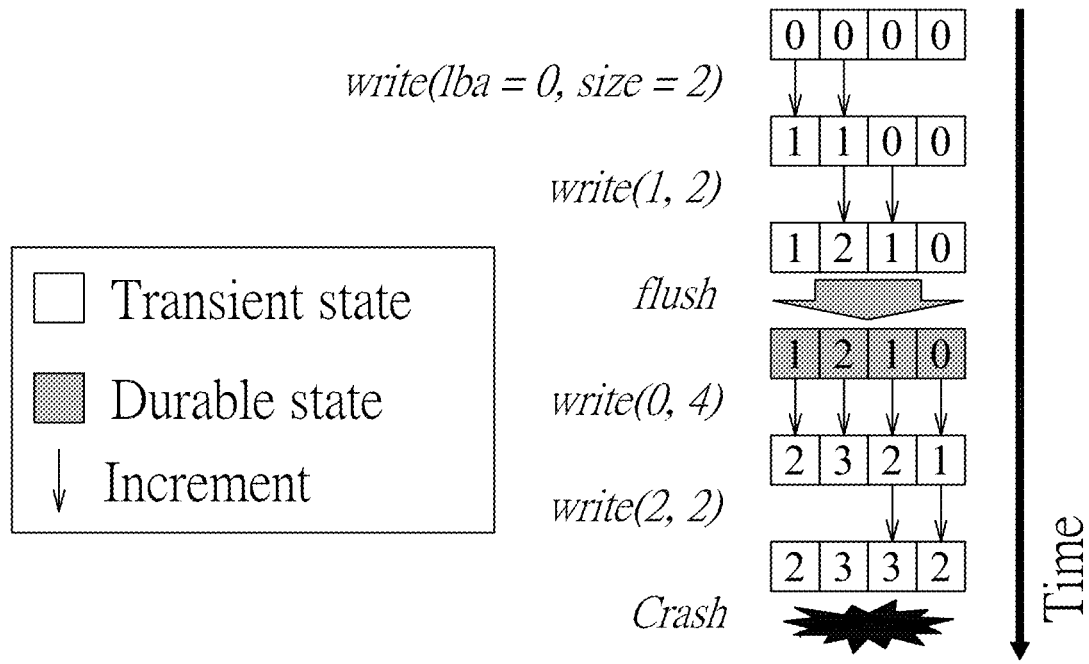
FIG. 15 is a schematic diagram illustrating an example of comparison of valid post-crash results between a conventional SSD and an SSD according to the disclosure.

To further explain, referring to FIG. 15, a comparison of the number of valid post-crash results for crash recovery between the baseline SSD and the OPTR SSD according to the disclosure is demonstrated. An SSD has four sectors that initially store four version numbers, "0", "0", "0" and "0", respectively. The SSD received four write requests and a flush request before a crash occurred, i.e., "write (0, 2)", "write (1, 2)", "flush", "write (0, 4)" and "write (2, 2)" in order, where each of the write requests is specified by a logical block address (LBA) and a size in parentheses. Under an assumption that the version number in each of the sectors is increased by one once the sector is written by one of the write requests, the baseline SSD can exhibit 2×2×3×3=36 valid post-crash results because the order of the write requests and the order of sectors being written are not preserved. In contrast, the OPTR SSD according to the disclosure guarantees that the write requests are completed in order and atomically, so the number of valid post-crash results is significantly reduced to three.

Since the crash guarantees provided by the SSD 1 according to the disclosure are clear, the chances for developers of future application software or filesystems to make mistakes may be reduced.

Moreover, benefited from such strong request-level crash guarantees, operational efficiency of a computer system may be improved by removing unnecessary flush requests to be issued by the filesystem in response to receipt of the instruction of synchronization by the application software.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A computer system, comprising:
    a solid-state storage device (SSD) including a nonvolatile memory;
    a main memory configured to store software; and
    a processor electrically connected to said SSD and said main memory, and configured to execute the software stored in said main memory,
    wherein said SSD is configured to receive a plurality of write requests in order, each of the write requests containing a specified address range and data to be written in said SSD,
    wherein said SSD is operable in an order-preserving mode where said SSD persists, in the nonvolatile memory, the data contained in the write requests according to an order in which the write requests are received,
    wherein said SSD is further configured to sequentially receive
        a first write request that contains a first address range of said SSD, and first data to be written in the first address range, and
        a second write request that contains a second address range of said SSD, and second data to be written in the second address range, and
    wherein said SSD is further configured to, during recovery from a crash of said SSD, restore the second address range to a state of not having been updated by the second request when it is determined that the first address range has been partially updated by the first write request and the second address range has been fully updated by the second write request.

2. The computer system as claimed in claim 1, wherein:
    said SSD further includes an identifier of order-preserving guarantee which indicates that said SSD is operating in the order-preserving mode, and said processor executing the software is configured to read the identifier of said SSD.

3. The computer system as claimed in claim 2, wherein:
the identifier is a binary code; and
said processor is further configured to determine that said SSD is operating in the order-preserving mode when it is determined that the logical value of the identifier thus read belongs to a predefined set of values.

4. The computer system as claimed in claim 2, wherein said processor is further configured to, when it is determined by said processor that said SSD is operating in the order-preserving mode according to the identifier thus read, enable a no-barrier option of the software to refrain from issuing any flush request.

5. The computer system as claimed in claim 1, wherein said computer system is provided with a human-readable indicator indicating that said SSD is operable in the order-preserving mode.

6. The computer system as claimed in claim 5, wherein said human-readable indicator is a symbol, a picture, a sticker or text on the SSD, or a description posted on the Internet.

7. The computer system as claimed in claim 1, wherein the computer system is one of a personal computer (PC), a database server, a cloud server, a laptop computer, a tablet computer, a mobile phone, a wearable computer, a smartwatch, a television, a datacenter cluster, and a network attached storage.

8. A solid-state storage device (SSD), comprising a nonvolatile memory and receiving a plurality of write requests in order, each of the write requests containing data to be written in said SSD, wherein:
said SSD is operable in an order-preserving mode where said SSD persists, in the nonvolatile memory, the data contained in the write requests according to an order in which the write requests are received;
said SSD is further configured to sequentially receive
a first write request that contains a first address range of said SSD, and first data to be written in the first address range, and
a second write request that contains a second address range of said SSD, and second data to be written in the second address range; and
said SSD is further configured to, during recovery from a crash of said SSD, restore the second address range to a state of not having been updated by the second request when it is determined that the first address range has been partially updated by the first write request and the second address range has been fully updated by the second write request.

9. The SSD as claimed in claim 8, wherein:
said SSD further comprises an identifier of order-preserving guarantee which indicates that said SSD is operating in the order-preserving mode.

10. The SSD as claimed in claim 8, wherein:
said SSD atomically persists, in the nonvolatile memory, the data contained in the write requests.

* * * * *